United States Patent [19]

Schoop et al.

[11] 3,873,765

[45] Mar. 25, 1975

[54] DISC PLAYBACK SYSTEM WITH SPEED CONTROL OF A BELT DRIVE

[75] Inventors: James Conrad Schoop; Frederick Roland Stave, both of Indianapolis, Ind.

[73] Assignee: RCA Corporation, New York, N.Y.

[22] Filed: June 18, 1974

[21] Appl. No.: 480,329

Related U.S. Application Data

[63] Continuation of Ser. No. 284,509, Aug. 29, 1972, abandoned.

[52] U.S. Cl.. 178/6.6 A, 179/100.1 S, 179/100.4 E, 318/302, 360/73, 360/86

[51] Int. Cl..... H04n 5/76, G11b 17/00, H02k 7/10

[58] Field of Search...... 178/6.6 P, 6.6 DD; 360/73, 360/70, 84, 86; 274/1 D, 1 E, 1 F, 9 A; 179/100.1 S, 100.4 E, 100.4 D; 318/302; 358/8

[56] References Cited

UNITED STATES PATENTS

| | | | |
|---|---|---|---|
| 2,334,510 | 11/1943 | Roberts | 179/100.4 E |
| 3,046,463 | 7/1962 | Johnson | 318/302 |
| 3,461,226 | 8/1969 | Carnt | 358/8 |
| 3,504,111 | 3/1970 | Sumida | 358/8 |
| 3,505,466 | 4/1970 | Prochnow | 360/70 |
| 3,560,635 | 2/1971 | Bruch | 358/9 |

FOREIGN PATENTS OR APPLICATIONS

| | | | |
|---|---|---|---|
| 737,378 | 9/1956 | United Kingdom | 274/9 A |
| 46-1447 | 1/1971 | Japan | 178/6.6 P |
| 1,065,257 | 4/1967 | United Kingdom | 360/70 |

*Primary Examiner*—Raymond F. Cardillo, Jr.
*Attorney, Agent, or Firm*—Eugene M. Whitacre; William H. Meagher

[57] ABSTRACT

A speed control system for a video disc playback system utilizes a speed change mechanism which permits the speed of the disc turntable to be varied without affecting the speed of the drive motor. A drive belt is coupled in non-slip relation to the disc turntable and the drive motor causing the turntable to rotate and thereby establish a relative motion between a video disc record mounted on the turntable and a pickup device. The free running speed of the turntable is above the normal operating speed required for proper operation of the playback system. A brake mechanism adjusts the speed of rotation of the turntable to control the speed of the relative motion between the disc record and the pickup device. The drive belt is yieldable such that the turntable can be adjusted to have a speed of rotation which is asynchronous with respect to the speed of rotation of the drive motor.

8 Claims, 1 Drawing Figure

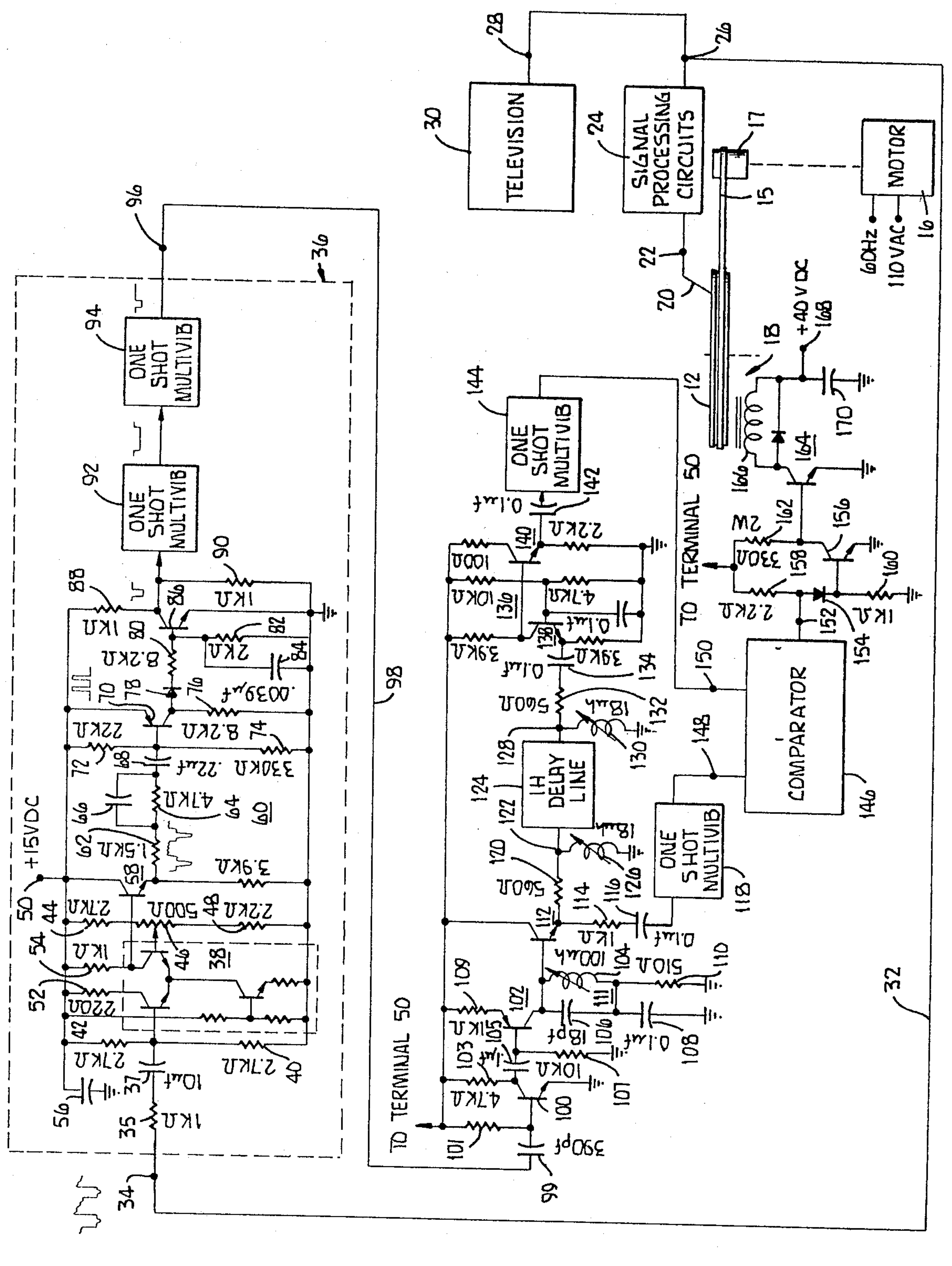
TELEVISION
SIGNAL PROCESSING CIRCUITS
MOTOR
60Hz
110VAC
+40VDC
+15VDC
ONE SHOT MULTIVIB
ONE SHOT MULTIVIB
ONE SHOT MULTIVIB
ONE SHOT MULTIVIB
ONE SHOT MULTIVIB
1H DELAY LINE
COMPARATOR
TO TERMINAL 50
TO TERMINAL 50

DISC PLAYBACK SYSTEM WITH SPEED CONTROL OF A BELT DRIVE

This is a continuation of application Ser. No. 284,509, filed 8-29-72 now abandoned.

The present invention pertains to video playback systems and more particularly to a drive system suitable for use with a video disc playback system.

It has been recognized in a U.S. Pat. Application, Ser. No. 284,510, now U.S. Pat. No. 3,827,612, concurrently filed with the parent hereof for Billy Wesley Beyers and entitled, "SPEED CONTROL SYSTEM," that a video disc turntable can be made to have a free running speed which is above the normal operating speed required for proper operation of the video playback system. In such a system, an error signal representative of the speed of the relative motion between a video disc record and a pickup device is applied to a turntable braking mechanism. The braking mechanism reduces the speed of the turntable and thereby adjusts the speed of the relative motion between the video disc record and the pickup device to reduce timing errors in the recovered video signal.

It is desirable in systems of this type to couple the drive motor and the turntable through a speed change mechanism which permits the speed of the turntable to be varied without affecting the speed of the drive motor. The speed change mechanism, however, should have a substantially linear speed change versus braking action characteristic which is controllable on a mass production basis and is repeatable during operation of the playback system.

In a playback system wherein a prerecorded signal is recovered from a disc record by a pickup device when relative motion is established between the disc record and the pickup device, a drive system embodying the present invention includes belt means mechanically coupled in nonslip relation to a turntable for supporting the disc record and a drive motor. The turntable is caused to rotate and thereby establish a relative motion between the disc record and the pickup device. Means are provided for adjusting the speed of rotation of the turntable to control the speed of the relative motion between the disc record and the pickup device. The belt means are yieldable such that said turntable can be adjusted to have a speed of rotation which is asynchronous with respect to the speed of rotation of said motor.

In accordance with a feature of the present invention, the drive motor is an induction type motor having a slip speed which varies as a function of the motor load, and the adjusting means adjusts the speed of rotation of the turntable by changing the motor load to vary the motor slip speed.

A complete understanding of the present invention may be obtained from the following detailed description of a specific embodiment thereof when taken in conjunction with the accompanying drawing, in which the single FIGURE is a schematic circuit diagram, partly in block form, of a speed control system utilizing a drive system embodying the present invention.

Referring now to the drawing, a video disc record 12 is mounted on a video disc player turntable 14. The turntable is fabricated from a conductive material and is driven through a drive belt 15 and a pulley 17 by a motor 16. The motor is a synchronous motor having a synchronous speed of 3600 RPM. The diameter of the turntable 14 and the diameter of the pulley 17 are selected to provide a free running turntable speed (455 RPM) slightly above the normal operating speed (449.55 RPM) of the turntable. A suitable drive motor for the player is the synchronous motor shown in a U.S. Pat. application, Ser. No. 240,037, filed Mar. 31, 1972, for John Allen Tourtellot and Frederick Roland Stave and entitled, "AC MOTOR" now U.S. Pat. No. 3,817,888. The patent application is assigned to RCA Corporation. It should be noted that the number of laminations in the rotor and stator sections of the synchronous motor are selected to give the desired motor torque. A braking system 18 slows the speed of rotation of the turntable 14 to compensate for the overdrive of the turntable by the motor 16.

A video disc pickup device 20 engages the video disc record 12. When relative motion is established between the record 12 and pickup device 20, prerecorded video information from the disc 12 is detected and applied to terminal 22 of the playback system signal processing circuits 24. The signal processsing circuits 24 process the signals applied to the terminal 22 to develop a composite video signal including synchronizing pulse components at the signal processing circuits output terminal 26. A video disc system and suitable signal processing circuits are disclosed in U.S. Pat. application Ser. No. 126,772, filed Mar. 22, 1972, for Jon Kaufman Clemens and entitled, "INFORMATION RECORDS AND RECORDING PLAYBACK SYSTEMS THEREFOR," and in another U.S. Patent application Ser. No. 126,678, filed Mar. 22, 1971, for Thomas Osborne Stanley and entitled, "HIGH-DENSITY INFORMATION RECORDS AND PLAYBACK APPARATUS THEREFOR" now U.S. Pat. No. 3,783,196. Both applications are assigned to the RCA Corporation.

The composite video signal developed at the terminal 26 is applied via a terminal 28 to the video signal processing circuits of a television receiver 30. If desired, the composite video signal developed at the terminal 26 may be modulated onto a carrier signal and applied to the antenna terminals, not shown, of the television receiver 30. The composite video signal at the terminal 26 is coupled by a lead 32 to terminal 34 of a sync separator stage 36. The sync separator stage 36 and other related circuitry provide signal information which recurs at the horizontal line scanning rate of the recovered composite video signal. The signal information is applied to a delay line to delay the signal information for a period of time corresponding to the normal duration of one horizontal line of the video signal. An error signal, which is applied to the braking mechanism 18, is generated by a comparison of the delayed and undelayed signal information pursuant to a speed error detecting and control signal generating arrangement which forms the subject matter of a copending application of Charles D. Boltz, Jr., Ser. No. 284,511, filed concurrently with the parent thereof. The braking mechanism 18 reduces the speed of the turntable 14 and adjusts the speed of the relative motion between the video disc 12 and the pickup device 20 to reduce timing errors in the recovered video signal.

The terminal 34 is coupled by a resistor 35 and capacitor 37 to a differential amplifier stage 38. The differential amplifier stage 38 may be an integrated circuit type CA 3028A sold by the RCA Corporation. The integrated circuit is described in an RCA publication entitled, "Linear Integrated Circuits, File No. 400," which may be obtained from RCA Electronic Components, Harrison, New Jersey. The differential amplifier stage 38 is biased to operate in a non-linear region. Bias resistors 40, 42, 44, 46 and 48 apply an operating potential to the differential amplifier from a terminal 50 which is adapted to be energized by a +15 volt DC supply. The terminal 50 is bypassed for signal frequencies by a capacitor 56. External load resistors 52 and 54 for the differential amplifier are coupled between the terminal 50 and the integrated circuit.

The output signal from the differential amplifier stage 38 is applied to an emitter follower stage 58. The voltage waveforms at the terminal 34, the input to the sync separator stage 36, and at the emitter electrode of the emitter follower stage 58 are shown. As is apparent, the composite video signal applied to the terminal 34 is amplified in a non-linear manner with the negative components of the signals (the synchronizing pulse components) amplified to a greater extent than less negative and positive components. The emitter follower stage 58 is connected through a low pass filter 60 including resistors 62 and 64 and capacitors 66 and 68 to the base electrode of a sync saparator transistor 70. Resistors 72 and 74 bias transistor 70 to its threshold of conduction. The negative going sync pulses cause the transistor to be biased heavily into conduction and a voltage is established across the resistor 76.

The voltage waveform at the collector electrode of transistor 70 is shown adjacent the device. The synchronizing pulse components are applied through a blocking diode 78 to an integrator circuit including the resistors 80 and 82 and the capacitor 84. The integrating circuit prevents transient voltage having a duration of less than approximately 5 microseconds (the duration of a horizontal synchronizing pulse) from biasing transistor 86 into conduction. When the voltage across resistor 82 and capacitor 84 reaches a level that biases transistor 86 into conduction, the voltage at the junction of resistors 88 and 90 drops toward ground potential and actuates a one shot multivibrator 92.

The one shot multivibrator 92 provides a negative going output pulse having a 45 microsecond duration. As a result, during the vertical blanking interval, when equalizing pulse components are applied to the sync separator input terminal 34, they do not affect the operation of the system. Specifically, the equalizing pulse components are applied to terminal 34 approximately every 31½microseconds during the vertical blanking interval. The first equalizing pulse actuates the one shot multivibrator 92 and the next equalizing pulse occurs after the multivibrator has been actuated and during a 45 microsecond output pulse. The second equalizing pulse has no effect on the multivibrator and does not initiate another output pulse from the multivibrator.

The output signal of the one shot multivibrator 92 is applied to another one shot multivibrator 94. Multivibrator 94, when actuated, provides a negative going output pulse having a five microsecond duration. This generates a train of pulses which corresponds in duration and timing to the horizontal synchronizing pulse components contained in the input signal applied to terminal 34. Multivibrators 92 and 94 increase the reliability of the system by preventing spurious signal information from being supplied to the remaining portion of the system.

Output pulses from the sync separator stage 36 are applied over a lead 98 and capacitor 99 to the base electrode of a normally conducting transistor 100. Operating potential for the transistor is obtained from the +15 volt DC supply at terminal 50 through resistors 101 and 103. The pulses periodically bias transistor 100 out of conduction. The positive voltage pulses which develop at the collector electrode of transistor 100 are applied to the base electrode of transistor 102 through capacitor 105. Resistor 107 allows transistor 102 to be normally conducting. The resulting pulse at the junction of capacitor 105 and resistor 107 biases the normally conducting transistor 102 out of conduction thereby interrupting the current flow to ground from terminal 50 through resistor 109, the emitter-collector electrode current path of transistor 102, and a 3.58 MHz tuned circuit 111.

The 3.58 MHz tuned circuit 111 includes the adjustable inductor 104 and capacitor 106. A resistor 110, bypassed for signal frequencies by capacitor 108, provides a collector electrode load impedance when transistor 102 is conducting. When transistor 102 is biased out of conduction, the tuned circuit 111 is caused to ring at a 3.58 MHz frequency. When transistor 102 becomes biased for conduction again after the positive voltage at its base electrode subsides, the ringing ceases. The generated burst of 3.58 MHz signal is applied to the base electrode of an emitter-follower transistor stage 112. The output signal from the emitter-follower state 112 is applied via a resistor 114 and capacitor 116 to a one shot multivibrator 118. The leading edge of each generated pulse of 3.58 MHz signal corresponds in timing to the leading edge of each horizontal pulse component in the video signal applied to the input terminal 34 of the sync separator stage 36. The output from the emitter-follower stage 112 is additionally applied via a resistor 120 to the input terminal 122 of a 63.5 microsecond delay line 124, ofter termed a "1H" delay line because the delay corresponds to the duration of one horizontal scan line of video signal information. The delay line 124 is a glass, acoustical type delay line. One suitable delay line is a DL45 delay line made by the Amperex Electronic Corporation and having a bandpass characteristic centered at 3.58 MHz.

The input impedance of the delay line 124 is tuned to 3.58 MHz by an adjustable inductor 126. Similarly, the output impedance of the delay line 124 is also tuned to 3.58 MHz by an adjustable inductor 130 coupled to the delay line output terminal 128. It should be recognized that the turned circuit 111 is selected to be at the center frequency of the delay line 124. Should the center frequency of the delay line 124 be changed, the frequency of the tuned circuit 111 would likewise be changed to correspond to the new center frequency.

Each burst of 3.58 MHz signal is applied to the delay line input terminal 122 and is developed at the delay line output terminal 128 after a 63.5 microsecond delay. The delayed bursts of 3.58 MHz signal are applied by resistor 132 and capacitor 134 to an amplifier stage 136 including a grounded base amplifier 138 and emitter-follower amplifier 140. The amplified delayed bursts of 3.58 MHz signal are coupled through a capacitor 142 to a one shot multivibrator 144.

The output signal from both the one shot multivibrator 118, actuated by the leading edge of each undelayed burst of 3.58 MHz signal, and the one shot multivibrator 144, actuated by the leading edge of each delayed burst of 3.58 MHz signal, are applied to a comparator stage 146. the comparator stage 146 may be a bistable multivibrator which is conditionable between either of two stable states depending on which of its input terminals 148 and 150 is energized. The comparator stage 146 provides a +4 volt DC potential at its output terminal 152 when terminal 148 is energized and a ground potential at its output terminal 152 when terminal 150 is energized. Simultaneous energization of terminals 148 and 150 causes the comparator stage output terminal voltage level to remain unchanged from its preceding condition. The comparator stage provides an output signal representative of the order in which the one shot multivibrators 118 and 144 are actuated. This, in turn, is directly related to the frequency of the horizontal synchronizing pulse components of the video signal applied to the input terminal 34 of the sync separator stage 36.

When the speed of the relative motion between the video disc record 12 and pickup 20 increases, the undelayed burst of 3.58 MHz signal actuates the one shot multivibrator 118 before the delayed burst of 3.58 MHz signal actuates the multivibrator 144. It should be recognized that the delayed burst of 3.58 MHz signal is due to the immediately preceding generated burst of 3.58 MHz signal and occurred at a time before the increase in speed of the relative motion. Under this condition, the one shot multivibrator 118 provides an output signal to comparator terminal 148 slightly before the one shot multivibrator 144 provides an output signal to comparator terminal 150. The combination of signals at terminals 148 and 150 causes the potential at the comparator output terminal 152 to first rise to +4 volts and then drop to ground potential. The ground potential remains for approximately 63.5 microseconds. At that time, another burst of 3.58 MHz signal will actuate the two one shot multivibrators 118 and 144, causing signals to be applied to the comparator.

If the relative speed between the video disc record 12 and pickup 20 remains high or further increases, a burst of 3.58 MHz signal is applied to multivibrator 118 before the delayed burst of 3.58 MHz signal (previously applied to multivibrator 118) is applied to multivibrator 144 and the sequence repeats. If the speed of the relative motion between the video disc record 12 and pickup 20 has decreased such that bursts of 3.58 MHz signal are applied to the one shot multivibrators 118 and 144 simultaneously, the ground potential at the terminal 152 remains unchanged for approximately another 63.5 microseconds.

When the speed of the relative motion between the video disc record 12 and pickup device 20 decreases below the normal desired proper operating speed, the one shot multivibrator 144 is actuated by a delayed burst of 3.58 MHz signal before the one shot multivibrator 118 is actuated by a burst of 3.58 MHz signal. It should be recognized that the undelayed burst of 3.58 MHz signal is due to an output signal from the sync separator stage 36 occurring after the decrease in speed of the relative motion has occurred, while the delayed burst of 3.58 MHz signal is due to the immediately preceding generated burst of 3.58 MHz signal which occurred at a time before the decrease in speed of the relative motion. Under this condition, a signal from multivibrator 144 is applied to the comparator input terminal 150 slightly before a signal from multivibrator 118 is applied to the comparator input terminal 148. This combination of signals at terminals 148 and 150 causes the voltage at comparator output terminal 152 to first drop to ground potential and then rise to 4 volts. This positive potential remains for approximately 63.5 microseconds at which time bursts of 3.58 MHz signal are again applied to both of the two one shot multivibratos 118 and 144 causing signals to be applied to the comparator 146.

If the speed of relative motion between the video disc record 12 and pickup device 20 remains low or further decreases, a burst of 3.58 MHz signal (previously applied to multivibrator 118) is applied to multivibrator 144 before a burst of 3.58 MHz signal is applied to multivibrator 118 and the sequence is repeated. If the speed of the relative motion between the video disc record 12 and the pickup device 20 increases such that bursts of 3.58 MHz signal are applied to the one shot multivibrators 118 and 144 simultaneously, the positive potential at the terminal 152 remains unchanged for approximately another 63.5 microseconds. When the speed of the relative motion between the video disc record 12 and pickup device 20 increases above the normal desired operating speed, the system operates in the manner previously described.

The comparator 146 provides a binary output signal representative of the frequency of the horizontal synchronizing pulse components of the video signal recovered from the record medium and processed in the signal processing circuits 24. Where the frequency of these components is too great for any reason, the comparator 146 provides output signals at the terminal 152 which cause the speed of the relative motion to decrease. The decrease in the speed of the relative motion decreases the frequency of the horizontal synchronizing pulse components. On the other hand, where the frequency of the horizontal synchronizing pulse components is too low for any reason, the comparator 146 provides output signals at terminal 152 which causes the speed of the relative motion to increase. The increase in speed of the relative motion increases the frequency of the horizontal synchronizing pulse components. It should be recognized that the comparator 146 may be other than a bistable multivibrator and may be designed to provide an analog output signal at terminal 152 based on the timing of the input signals applied to the comparator input terminals 148 and 150. Appropriate circuitry would then be used following this stage to cause the analog signal to control the speed of the drive system.

The comparator output terminal 152 is connected by a diode 154 to the base electrode of a normally conducting transistsor 156. The transistor 156 is biased for conduction from the source of DC potential at terminal 50 by the resistors 158 and 160. When the comparator output terminal 152 is at ground potential, transistsor 156 is biased out of conduction, and when the comparator output terminal 152 is at +4 volts, transistor 156 remains biased for conduction. The collector electrode of transistor 156 is directly connected to the base electrode of a normally non-conducting transistor 164. The collector-emitter electrode current path of transistor 164 is connected in series with an iron core inductor 166 between a terminal 168 and ground. The terminal 168 is adapted to be energized by a +40 volt DC potential and is bypassed to ground for AC signals by a capacitor 170.

The iron core inductor 166 is positioned adjacent the metal video disc turntable 14 such that the metal turntable becomes a part of the magnetic flux path for the field of the iron core inductor. When current flows through the iron core inductor 166, a magnetic field is established which induces eddy currents in the metal turntable 14. the eddy currents in the metal turntable set up a magnetic field which interacts with the magnetic field of the iron core inductor 166 creating a braking force which tends to oppose the rotation of the video disc turntable 14. The magnitude of the force induced by the eddy currents is sufficient to slow the rotation of the turntable to establish the proper operating speed of the relative motion between the video disc record 12 and pickup device 20 to provide the desired horizontal synchronizing pulse component frequency of the recovered video signal.

The braking force produced by the eddy currents causes the turntable 14 to rotate at an asynchronous speed with respect to the 3600 RPM pulley rotation speed. The asynchronous operation is provided by virtue of the drive belt 15. Drive belt 15 is fabricated from an elastic material such as neoprene rubber or polyurethane and has a rectangular cross section 0.230 inch by 20 milli-inches. The belt provides a controllable, repeatable linear speed change mechanism utilizing the creep of the belt. The drive belt 15 is mounted in one-slip relation around the periphery of the pulley 17 and turntable 14 being stretched approximately 10 percent over its non-mounted inner circumference of 29.0 inches. The stretch is controlled by selecting the distance (6.188 inches) between the axis of rotation for the 1.145 inch diameter pulley 17 and 9.236 inch diameter turntable 14.

It has been found that the braking action produced by the eddy currents can reduce the turntable rotational speed from its free running speed of 455 RPM to as low as 445 RPM without introducing slippage between the drive belt 15 and either the pulley 17 or turntable 14. Because of the elastic yieldable property of the drive belt 15, the braking action causes the belt to creep. Specifically, the braking action tends to stretch the portion of the belt coming off the turntable and compress the portion of the belt coming onto the turntable without causing slippage between the drive belt and either the pulley 17 or turntable 14.

The turntable can also be caused to rotate at an asynchronous speed with respect to the pulley 17 with other types of drive means. For example, the pulley 17 and turntable 14 can be coupled by an idler wheel similar to audio phonographs, with the braking action causing slippage between either the turntable or pulley. However, it has been found that slippage type coupling between the pulley and turntable, either by means of an idler wheel or a belt, does not provide as controllable and repeatable a speed change mechanism as the creep belt coupling described above.

Where the motor 16 is an induction type motor, a slip speed exists between the speed of the rotating stator field and the rotating rotor structure. The slip speed of the motor is a function of the motor load. Consequently, the braking action produced by the eddy currents changes the motor load and thereby varies the slip speed of the motor to control the speed of rotation of the turntable. The slip speed effect of the motor 16 can be combined with the creep belt coupling drive described above.

In operation, when the comparator output terminal 152 drops to ground potential, transistor 156 is biased out of conduction which in turn biases transistor 164 for conduction. This represents a condition where the frequency of the horizontal synchronizing pulse components of the recovered video signal is above its desired level. Conduction of transistor 164 causes current to flow through the iron core inductor 166 which establishes a braking force tending to slow the rotation of the turntable 14. The rotation of the turntable 14 is slowed to the point where the frequency of the horizontal synchronizing pulse components of the recovered video signal is below the desired level. At this time, the comparator output terminal 152 rises to a positive potential, and transistor 156 is biased for conduction. This biases transistor 164 out of conduction, stopping the current flow through the iron core inductor 166 and thereby removing the braking force. With the breaking force removed, the rotational speed of the turntable 14 increases toward its free running speed. When the speed reaches the point that the frequency of the horizontal synchronizing pulse components of the recovered video signal is too high, the process repeats itself. It can be seen that the rotational speed of the video disc turntable is continuously adjusted to provide the normal desired proper operating frequency for the horizontal synchronizing pulse components of the recovered video signal.

Color encoding systems for video playback systems have been proposed in which the recovered video signal is decoded by circuits which include a delay line. One color encoding system of this type is shown in U.S. Pat. No. 3,560,635 granted to Walter Bruch. For proper operation of these systems, however, it is necessary that the time interval between each horizontal scan line of the recovered video signal precisely match the delay of the delay line utilized in the decoding circuits. If the speed relationship between the record medium and pickup device causes the interval between the horizontal scan lines of the recovered video signal not to match the delay of the delay line, the decoding circuits will not operate properly.

What is claimed is:

1. In a playback system wherein a prerecorded signal is recovered from a disc record by a pickup device when relative motion is established between said disc record and said pickup device by rotation of a turntable supporting said disc record, said playback system including braking means for controllably applying a braking force to said turntable, said braking means being responsive to the output of a speed detecting means for varying the effect of said braking force in accordance with deviations of the velocity of said relative motion from a desired operating velocity; a drive system comprising:

a pulley;

a motor, subject to substantially constant frequency energization independent of the output of said speed detecting means, for rotating said pulley;

a belt of elastic material stretched to encircle respective cylindrical surfaces of said turntable and said pulley, the diameter of said cylindrical surface of said turntable exceeding the diameter of said cylindrical surface of said pulley, for transmitting rotational motion to said turntable in a manner establishing a given step-down ratio between the respective rotational rates of said pulley and turntable when said motor is subjected to said energization in the absence of operation of said braking means, said given ratio being chosen to establish said relative motion between said disc record and said pickup device at a given velocity exceeding said desired operating velocity; and the length of said belt, the distance between the axes of rotation of said pulley and said turntable, and the elasticity of said belt material being so related as to permit the ratio of rotational rates of said pulley and turntabe to vary over a range of ratios differing from said given step-down ratio, when said motor is subject to said energization in the presence of operation of said braking means, without slippage between said belt and said cylindrical surfaces.

2. A drive system as defined in claim 1 wherein said motor is an induction type motor having a slip speed which varies as a function of the motor load.

3. A drive system as defined in claim 1 wherein said precordered signal is a video signal.

4. A drive system as defined in claim 1 wherein said motor is a synchronous motor.

5. A drive system as defined in claim 1 wherein said belt material is polyurethane.

6. A drive system as defined in claim 1 wherein the application of said braking force to said turntable by said braking means is intermittent, and wherein said range of ratios is sufficiently wide to accommodate a difference between said given velocity and the operating velocity of said relative motion of the order of 1 percent without introduction of said slippage.

7. A drive system as defined in claim 1 wherein said belt material is neoprene rubber.

8. A drive system as defined in claim 7 wherein said belt material has a rectangular cross section.

* * * * *